US009799451B2

United States Patent
Park et al.

(10) Patent No.: US 9,799,451 B2
(45) Date of Patent: Oct. 24, 2017

(54) DIELECTRIC COMPOSITION AND MULTILAYER CERAMIC CAPACITOR CONTAINING THE SAME

(71) Applicant: SAMSUNG ELECTRO-MECHANICS CO., LTD., Suwon-si, Gyeonggi-do (KR)

(72) Inventors: Jae Sung Park, Suwon-si (KR); Jin Seong Kim, Suwon-si (KR); Doo Young Kim, Suwon-si (KR); Chang Hoon Kim, Suwon-si (KR)

(73) Assignee: SAMSUNG ELECTRO-MECHANICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/202,159

(22) Filed: Jul. 5, 2016

(65) Prior Publication Data

US 2017/0186537 A1    Jun. 29, 2017

(30) Foreign Application Priority Data

Dec. 28, 2015  (KR) .................. 10-2015-0187166

(51) Int. Cl.
| | | |
|---|---|---|
| H01G 4/12 | (2006.01) | |
| C04B 35/468 | (2006.01) | |
| H01G 4/30 | (2006.01) | |
| H01G 4/248 | (2006.01) | |
| H01G 4/008 | (2006.01) | |

(52) U.S. Cl.
CPC ....... *H01G 4/1227* (2013.01); *C04B 35/4686* (2013.01); *H01G 4/0085* (2013.01); *H01G 4/248* (2013.01); *H01G 4/30* (2013.01); *C04B 2235/3236* (2013.01)

(58) Field of Classification Search
CPC .................. C04B 35/46882; H01G 4/1227
See application file for complete search history.

(56) References Cited

U.S. PATENT DOCUMENTS

| | | | | |
|---|---|---|---|---|
| 8,400,755 B2* | 3/2013 | Ikeda | .................. | C04B 35/4682 361/321.4 |
| 8,404,607 B2* | 3/2013 | Fukuda | ................ | H01G 4/1227 361/321.4 |
| 8,771,631 B2* | 7/2014 | Nakagawa | ........... | H01G 4/1227 423/598 |
| 8,830,651 B2* | 9/2014 | Yamaguchi | .............. | H01B 3/12 361/301.2 |
| 9,111,683 B2* | 8/2015 | Yamaguchi | ......... | C04B 35/4682 |

(Continued)

FOREIGN PATENT DOCUMENTS

| | | |
|---|---|---|
| JP | 2006-169051 A | 6/2006 |
| JP | 2006-206362 A | 8/2006 |

*Primary Examiner* — Karl Group
(74) *Attorney, Agent, or Firm* — McDermott Will & Emery LLP (57) ABSTRACT

A dielectric composition and a multilayer ceramic capacitor containing the same are provided. The dielectric composition contains an oxide of Ba and Ti as a main ingredient, and the main ingredient is represented by $(Ba_{1-x}(Na, Ca)_x)TiO_3$, where $0.005 \le x \le 0.035$ and $0.994 < (Ba_{1-x}(Na, Ca)_x)/Ti < 1.003$.

15 Claims, 3 Drawing Sheets

(56) References Cited

U.S. PATENT DOCUMENTS

| | | | |
|---|---|---|---|
| 2007/0123413 A1* | 5/2007 | Suzuki | H01G 4/30 |
| | | | 501/138 |
| 2011/0170228 A1* | 7/2011 | Ikeda | C04B 35/4682 |
| | | | 361/301.4 |
| 2011/0216471 A1* | 9/2011 | Fukuda | H01G 4/1227 |
| | | | 361/321.4 |
| 2011/0234364 A1 | 9/2011 | Abe et al. | |
| 2013/0163144 A1* | 6/2013 | Shimada | H01G 4/005 |
| | | | 361/321.2 |
| 2014/0009868 A1* | 1/2014 | Yamaguchi | C04B 35/4682 |
| | | | 361/321.4 |
| 2014/0078642 A1* | 3/2014 | Shinichi | H01B 3/12 |
| | | | 361/301.4 |
| 2015/0041701 A1* | 2/2015 | Murakami | B41J 2/14233 |
| | | | 252/62.9 PZ |
| 2016/0118188 A1* | 4/2016 | Wada | H01G 4/30 |
| | | | 361/301.4 |

\* cited by examiner

DIELECTRIC COMPOSITION AND MULTILAYER CERAMIC CAPACITOR CONTAINING THE SAME

CROSS-REFERENCE TO RELATED APPLICATION

This application claims the benefit of priority to Korean Patent Application No. 10-2015-0187166, filed on Dec. 28, 2015 with the Korean Intellectual Property Office, the entirety of which is incorporated herein by reference.

TECHNICAL FIELD

The present disclosure relates to a novel dielectric composition capable of satisfying X5R, X7R, and X8R temperature characteristics to improve reliability, and a multilayer ceramic capacitor containing the same.

BACKGROUND

Recently, heat generation has become a significant issue for electronic devices, because of the increased size of display devices, the increased speed of central processing units (CPUs) of computers, and the like. Therefore, the market requirements for an X5R (operating temperature: −55° C.-+85° C.) multilayer ceramic capacitor; an X7R (operating temperature: −55° C.-+125° C.) multilayer ceramic capacitor; and further, an X8R (operating temperature: −55° C.-+150° C.) multilayer ceramic capacitor, which are capable of securing stable capacitance and reliability at a high temperature for stable operation of an integrated circuit (IC), have increased.

Furthermore, in accordance with the recent trend toward miniaturization, decreased weight, and multi-functionality of general electronic products, a multilayer ceramic capacitor (MLCC) having a compact size, high capacitance, and a resistance to high pressure has been continuously demanded. Therefore, excellent withstand voltage and DC characteristics, in addition to thinness of a dielectric layer, have been considered important features in developing the X5R, X7R, and X8R multilayer ceramic capacitors.

The thinness and resistance to high pressure characteristics of the dielectric layer increase the intensity of an applied electric field, and may deteriorate the DC characteristics and the withstand voltage characteristics thereof. In particular, a fine structural defect due to the thinness of the dielectric layer may have a severe negative influence on the withstand voltage characteristics such as breakdown voltage (BDV), high-temperature insulation resistance (IR), and the like.

SUMMARY

An aspect of the present disclosure provides a novel dielectric composition capable of improving X5R, X7R, and X8R temperature characteristics and reliability, and a multilayer ceramic capacitor containing the same.

According to an aspect of the present disclosure, a dielectric composition contains an oxide of Ba and Ti as a main ingredient, wherein the main ingredient is represented by $(Ba_{1-x}(Na, Ca)_x)TiO_3$, where $0.005 \leq x \leq 0.035$ and $0.994 < (Ba_{1-x}(Na, Ca)_x)/Ti < 1.003$.

According to another aspect of the present disclosure, a multilayer ceramic capacitor is implemented using the dielectric composition as described above, and thus dielectric characteristics, withstand voltage characteristics, and the like, may be improved.

According to another aspect of the present disclosure, a multilayer ceramic capacitor comprises a ceramic body in which dielectric layers and internal electrodes are alternately stacked. The dielectric layer contains a dielectric composition containing an oxide of Ba and Ti as a main ingredient, and the main ingredient is represented by $(Ba_{1-x}(Na, Ca)_x)TiO_3$, where $0.005 \leq x \leq 0.035$ and $0.994 < (Ba_{1-x}(Na, Ca)_x)/Ti < 1.003$.

According to another aspect of the present disclosure, a multilayer ceramic capacitor comprises pluralities of first and second internal electrodes that are alternately stacked; and a plurality of dielectric layers disposed between adjacent internal electrodes of the stacked first and second internal electrodes. The dielectric layers contain a dielectric composition including a main ingredient, and the main ingredient is $BaTiO_3$ partially substituted with at least one of Na and Ca.

According to another aspect of the present disclosure, a method of manufacturing a multilayer ceramic capacitor, the method comprising the steps of: preparing a slurry including a main ingredient powder and an accessory ingredient powder; preparing sheets using the prepared slurry; stacking the prepared sheets; and sintering the stacked sheets. The main ingredient powder is represented by $(Ba_{1-x}(Na, Ca)_x)TiO_3$, where $0.005 \leq x \leq 0.035$ and $0.994 < (Ba_{1-x}(Na, Ca)_x)/Ti < 1.003$.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship relative to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

The present disclosure relates to a dielectric composition and an electronic component containing the same. Examples of an electronic component containing the dielectric composition include a capacitor, an inductor, a piezoelectric element, a varistor, a thermistor, and the like. Hereinafter, the dielectric composition and a multilayer ceramic capacitor as an example of the electronic component will be described.

Dielectric Composition

A dielectric composition according to an exemplary embodiment in the present disclosure contains an oxide of Ba and Ti as a main ingredient, wherein the main ingredient is represented by a Composition Formula $(Ba_{1-x}(Na, Ca)_x)TiO_3$ in which Ba is partially substituted with Na or Ca, and $0.005 \leq x \leq 0.035$ and $0.994 < (Ba_{1-x}(Na, Ca)_x)/Ti < 1.003$ are satisfied.

The dielectric composition satisfying the above-mentioned condition may satisfy the X5R (operating temperature: −55° C.-+85° C.), X7R (operating temperature: −55° C.-+125° C.), and X8R (operating temperature: −55° C.-+150° C.) characteristics of the Electronic Industries Association (EIA) standard.

In more detail, according to the exemplary embodiment, a dielectric composition capable of using nickel (Ni) as an internal electrode and being sintered at 1300° C. or less under a reducing atmosphere at which nickel (Ni) is not oxidized may be provided. In addition, the present disclosure may provide a multilayer ceramic capacitor using the dielectric composition, and thus the temperature characteristics may be satisfied, and excellent reliability may be implemented.

Hereinafter, each ingredient of the dielectric composition according to the exemplary embodiment will be described in detail.

a) Main Ingredient

In the dielectric composition according to an exemplary embodiment, the main ingredient is the oxide of Ba and Ti. In detail, the main ingredient may be represented by the Composition Formula $(Ba_{1-x}(Na, Ca)_x)TiO_3$ in which Ba is partially substituted with Na or Ca, and $0.005 \leq x \leq 0.035$ and $0.994 < (Ba_{1-x}(Na, Ca)_x)/Ti < 1.003$ are satisfied.

According to a reduction model, which is a representative degradation model of a multilayer ceramic capacitor (MLCC), an oxygen void having high mobility may be formed in a basic structure of $BaTiO_3$, and degradation is generated by migration of this oxygen void. That is, when an electric field is applied in a state in which the oxygen void is present, the oxygen void migrates to a cathode, and thus a concentration gradient of the oxygen void is formed around the cathode. At an anode, however, oxygen is reduced while being released, and thus a concentration of electrons is increased.

As described above, since a leakage current may be increased by migration of the oxygen void, the present inventors tried to deduce an effective method capable of controlling a concentration of the oxygen void and lowering its mobility. According to the related art, in order to lower the concentration of the electrons or suppress the mobility of the electrons, a method of adjusting an addition amount of an acceptor dopant has been used, but in this method, a stoichiometric ratio is not satisfied, and thus, problems such as defects, or the like, may occur.

Conversely, in the case of the dielectric composition according to the present exemplary embodiment, the problem may be solved by substituting Ba with an element (Ca) having the same valence as that of Ba, or an element (Na) having a lower valence than that of Ba, while having a smaller ion size relative to a Ba ion. More specifically, FIG. 1 is a view schematically illustrating a lattice structure that is changed when Ba is substituted with Ca or Na in $BaTiO_3$.

Figure 1:
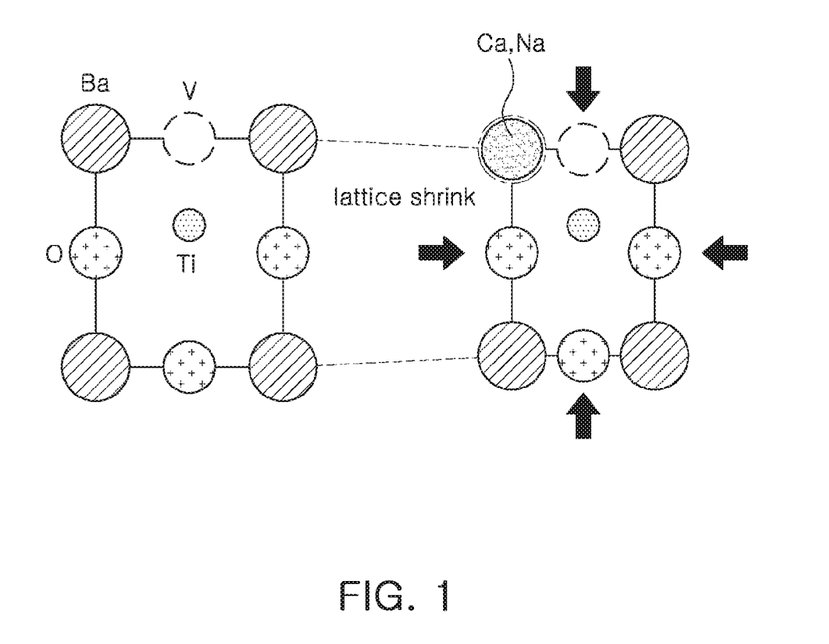
FIG. 1 is a view schematically illustrating a lattice structure that is changed when Ba is substituted with Ca or Na in $BaTiO_3$.

As illustrated in FIG. 1, in a case in which Ba is substituted with Ca or Na, which have a smaller ion size than that of the Ba ion, lattice distortion may occur while the lattice is shrunk, and thus mobility of the oxygen void V may be significantly decreased. In this case, as mobility of the oxygen void V is decreased, a leakage current is decreased, and thus a dielectric composition having excellent characteristics may be obtained. Further, since the stoichiometric ratio may be satisfied (in a case of Ca) or the concentration of the electrons may be significantly reduced (in a case of Na) while Ba is substituted with the element having a smaller size, deterioration of dielectric characteristics may be significantly decreased. Elements such as Dy or Y also have ion sizes small enough to substitute a Ba site, but since valences thereof are larger than that of the Ba ion, these donor type dopants may generate excess electrons when the Ba site is substituted. Therefore, these elements are not suitable for improving reliability through lattice distortion.

According to a study of the present inventors, when addition amounts of Na and Ca exceed certain amounts, however, permittivity and insulation characteristics of the dielectric composition may be deteriorated. This may be caused by a decrease in the level of polarization or the deterioration of dielectric characteristics due to excessive substitution, or an increase in the concentration of a defect such as the oxygen void defect-chemically formed.

Therefore, in selecting a substitution element for Ba, there is a need to select an optimal content ratio. In addition, since a (Ba, Na)/Ti or (Ba, Ca)/Ti ratio also has a large influence on dielectric characteristics, there is a need to determine a suitable ratio. The reason is that a solid-solution limit of an addition element substituting an A site may be changed depending on an A/B ratio in a perovskite type $ABO_3$ structure to thereby have an influence on sintering behavior, dielectric characteristics, and reliability. In relation to this, according to the study of the present inventors, when $(Ba_{1-x}(Na, Ca)_x)/Ti$ is close to 1, since the value of the axial ratio (c/a) is large and the level of polarization is also increased, high relative dielectric characteristics may be obtained. Furthermore, since a solid-solution limit of the element substituting the Ba site is most efficient, in order to have high dielectric characteristics and reliability, the ratio $(Ba_{1-x}(Na, Ca)_x)/Ti$ should be designed to be close to 1.

As a result of comprehensively considering the above-mentioned facts, the dielectric composition according to the present exemplary embodiment may satisfy $0.005 \leq x \leq 0.035$ and $0.994 < (Ba_{1-x}(Na, Ca)_x)/Ti < 1.003$. A detailed description thereof will be provided in Experimental results to be described below.

The X5R, X7R, and X8R characteristics may be satisfied by using the dielectric composition according to the present exemplary embodiment, and thus, dielectric characteristics and high-temperature withstand voltage characteristics may be improved.

b) First Accessory Ingredient

According to the exemplary embodiment in the present disclosure, the dielectric composition may further contain an oxide or carbonate containing at least one among Mn, V, Cr, Fe, Ni, Co, Cu, and Zn as a first accessory ingredient. The first accessory ingredient, which is a variable valence acceptor, may serve to lower a sintering temperature of a multilayer ceramic capacitor to which the dielectric composition is applied, and may also serve to improve the high-temperature withstand voltage characteristics thereof. In this case, although not necessarily limited, the first accessory ingredient may be contained in a content of 0.1 to 1.0 mol %, based on 100 mol % of the main ingredient. The content of the first accessory ingredient and contents of other accessory ingredients to be described below, which are contents based on 100 mol % of the main ingredient, may be particularly defined as mol % of a metal ion contained in a respective accessory ingredient. In a case in which the content of the first accessory ingredient is less than 0.1 mol %, based on the main ingredient, reduction resistance and reliability may be deteriorated, and in a case in which the content is 1.0 mol % or more, the sintering temperature may be increased, and capacitance may be decreased, etc.

c) Second Accessory Ingredient

According to the exemplary embodiment, the dielectric composition may further contain an oxide or carbonate of at least one of Mg and Al as a second accessory ingredient. The second accessory ingredient, which is a fixed valence acceptor, may serve to lower the sintering temperature of the multilayer ceramic capacitor to which the dielectric composition is applied, and may also serve to improve the high-temperature withstand voltage characteristics thereof. In this case, although not necessarily limited, the second accessory ingredient may be contained in a content of 0.1 to 1.0 mol %, based on 100 mol % of the main ingredient. In a case in which the content of the second accessory ingredient is less than 0.1 mol %, based on the main ingredient, reduction resistance and reliability may be deteriorated, and in a case in which the content is 1.0 mol % or more, the sintering temperature may be increased, and capacitance may be decreased, etc.

d) Third Accessory Ingredient

According to the exemplary embodiment, the dielectric composition may further contain an oxide or carbonate of at least one among Ce, Nb, La, and Sb as a third accessory ingredient. In this case, although not necessarily limited, the third accessory ingredient may be contained in a content of 0.1 to 1.0 mol %, based on 100 mol % of the main ingredient.

e) Fourth Accessory Ingredient

According to the exemplary embodiment, the dielectric composition may further contain an oxide or carbonate of at least one among Si, Ba, Ca, and Al as a fourth accessory ingredient. In this case, although not necessarily limited, the fourth accessory ingredient may be contained in a content of 0.1 to 1.0 mol %, based on 100 mol % of the main ingredient.

In addition, as another example of the fourth accessory ingredient, the dielectric composition may contain a glass compound containing Si. Similarly, the content of the fourth accessory ingredient may be within the range of 0.1 to 1.0 mol %, based on 100 mol % of the main ingredient.

Multilayer Ceramic Capacitor

Figure 2:
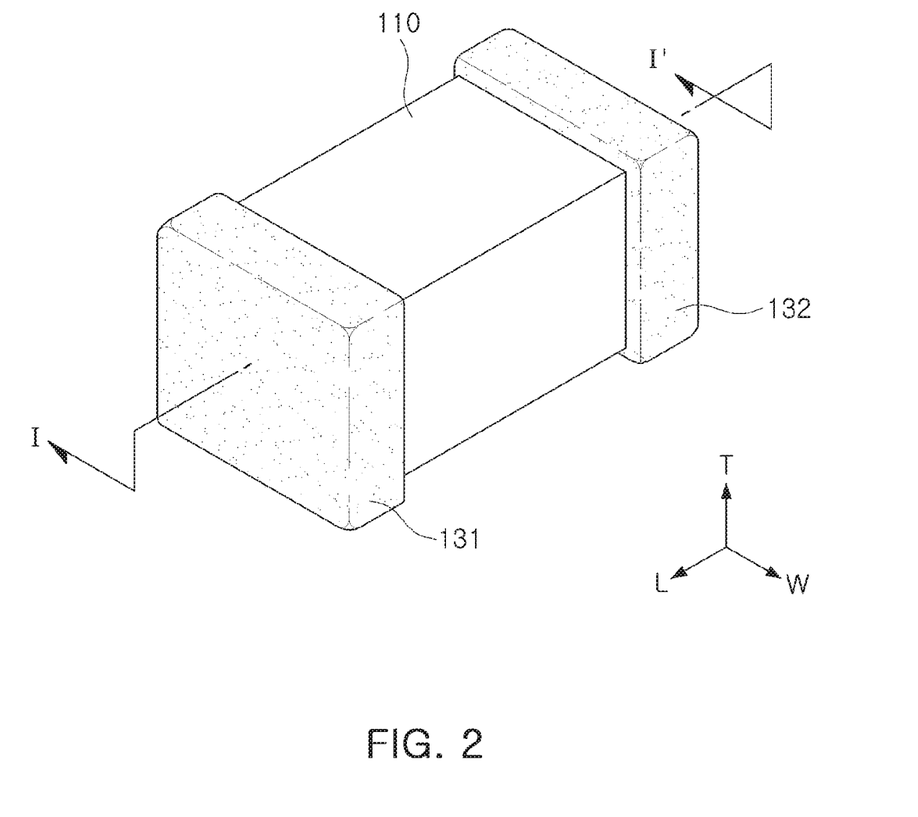
FIG. 2 is a perspective view illustrating a multilayer ceramic capacitor according to an exemplary embodiment in the present disclosure.
Figure 3:
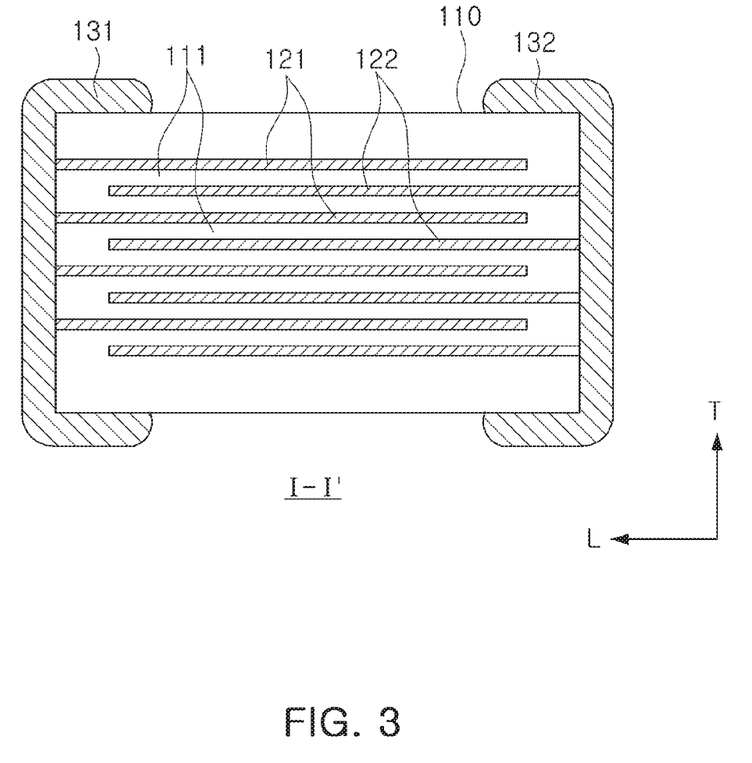
FIG. 3 is a cross-sectional view illustrating the multilayer ceramic capacitor, taken along line I-I' of FIG. 2.

FIG. 2 is a schematic perspective view illustrating a multilayer ceramic capacitor according to another exemplary embodiment in the present disclosure, and FIG. 3 is a cross-sectional view illustrating the multilayer ceramic capacitor, taken along line I-I' of FIG. 2.

Referring to FIGS. 2 and 3, the multilayer ceramic capacitor 100 according to the present exemplary embodiment may include a ceramic body 110 in which dielectric layers 111 and first and second internal electrodes 121 and 122 are alternately stacked. First and second external electrodes 131 and 132 electrically connected to the first and second internal electrodes 121 and 122 alternately disposed in the ceramic body 110, respectively, may be formed on both end portions of the ceramic body 110.

A shape of the ceramic body 110 is not particularly limited, but may generally be a hexahedral shape. In addition, dimensions of the ceramic body 110 are not particularly limited, and the ceramic body may have a suitable dimension depending on the use. For example, the ceramic body may have dimensions of (0.6-5.6 mm)×(0.3-5.0 mm)×(0.3-1.9 mm).

A thickness of the dielectric layer 111 may be optionally changed according to a capacitance design of the capacitor. According to the exemplary embodiment, a thickness of a single dielectric layer after sintering may be 0.2 µm or more. In a case in which the dielectric layer has an excessively reduced thickness, the number of grains existing in the single dielectric layer is small, which has a negative influence on reliability. Therefore, the thickness of the dielectric layer may be 0.2 μm or more.

The first and second internal electrodes 121 and 122 may be stacked so that end surfaces thereof are exposed to alternating surfaces of first and second end portions of the ceramic body 110 opposing each other, respectively, as shown in FIG. 3. The first and second external electrodes 131 and 132 may be formed on the first and second end portions of the ceramic body 110 and respectively electrically connected to the exposed end surfaces of the first and second internal electrodes 121 and 122, thereby configuring a capacitor circuit.

A conductive material contained in the first and second internal electrodes 121 and 122 is not particularly limited, and in a case of forming the ceramic body 110 using the dielectric composition according to the exemplary embodiment, the internal electrodes 121 and 122 may be formed of a material capable of being sintered at about 1300° C. or less under a reducing atmosphere and containing a Ni ingredient.

A thickness of the first and second internal electrodes 121 and 122 may be appropriately determined depending on the use, or the like, but is not particularly limited. For example, the thickness may be within the range of 0.1 μm to 5 μm or the range of 0.1 μm to 2.5 μm.

A conductive material contained in the first and second external electrodes 131 and 132 is not particularly limited, and nickel (Ni), copper (Cu), or an alloy thereof may be used. A thickness of the first and second external electrodes 131 and 132 may be appropriately determined depending on the use, or the like, but is not particularly limited. For example, the thickness of the external electrodes 131 and 132 may be 10 μm to 50 μm.

The dielectric layer 111 configuring the ceramic body 110 may contain a dielectric composition containing the ingredients according to the exemplary embodiment described above.

Since features of the dielectric composition are the same as those of the dielectric composition according to the exemplary embodiment described above, a detailed description thereof will be omitted.

EXPERIMENTAL EXAMPLE

Hereinafter, the present disclosure will be described in detail through Experimental Examples performed by the present inventors, but the purpose of the Experimental Examples are to help the specific understanding of the present disclosure. Therefore, the scope of the present disclosure is not limited thereto.

As a base material main ingredient, $BaTiO_3$ powder (100 nm) was used. In this case, specific composition ratios of a main ingredient and accessory ingredients were illustrated in the following Table 1 (Na substitution) and Table 2 (Ca substitution). In detail, composition samples in which contents of the accessory ingredients were fixed to the following ratios, and contents of Na and Ca and a $Ba_{1-x}(Na, Ca)_x/Ti$ value were changed were prepared.

TABLE 1

| Experimental Example | Main Ingredient (Ba, Na)TiO$_3$ | X (%) | (Ba$_{1-x}$Na$_x$)/Ti | Accessory Ingredient (%) | | | | | | |
|---|---|---|---|---|---|---|---|---|---|---|
| | | | | Dy$_2$O$_3$ | BaCO$_3$ | ZrO$_2$ | Mn$_3$O$_4$ | V$_2$O$_5$ | Al$_2$O$_3$ | SiO$_2$ |
| 1 | (Ba$_{1-x}$Na$_x$) | 0.0 | 0.994 | 1.0 | 0.7 | 0.5 | 0.2 | 0.05 | 0.1 | 1.25 |
| 2 | | 0.5 | | | | | | | | |
| 3 | | 1.0 | | | | | | | | |
| 4 | | 1.5 | | | | | | | | |
| 5 | | 2.0 | | | | | | | | |
| 6 | | 2.5 | | | | | | | | |
| 7 | | 3.0 | | | | | | | | |
| 8 | | 3.5 | | | | | | | | |
| 9 | | 4.0 | | | | | | | | |
| 10 | (Ba$_{1-x}$Na$_x$) | 0.0 | 0.997 | | | | | | | |
| 11 | | 0.5 | | | | | | | | |
| 12 | | 1.0 | | | | | | | | |
| 13 | | 1.5 | | | | | | | | |
| 14 | | 2.0 | | | | | | | | |
| 15 | | 2.5 | | | | | | | | |
| 16 | | 3.0 | | | | | | | | |
| 17 | | 3.5 | | | | | | | | |
| 18 | | 4.0 | | | | | | | | |
| 19 | (Ba$_{1-x}$Na$_x$) | 0.0 | 1.000 | | | | | | | |
| 20 | | 0.5 | | | | | | | | |
| 21 | | 1.0 | | | | | | | | |
| 22 | | 1.5 | | | | | | | | |
| 23 | | 2.0 | | | | | | | | |
| 24 | | 2.5 | | | | | | | | |
| 25 | | 3.0 | | | | | | | | |
| 26 | | 3.5 | | | | | | | | |
| 27 | | 4.0 | | | | | | | | |
| 28 | (Ba$_{1-x}$Na$_x$) | 0.0 | 1.003 | | | | | | | |
| 29 | | 0.5 | | | | | | | | |
| 30 | | 1.0 | | | | | | | | |
| 31 | | 1.5 | | | | | | | | |
| 32 | | 2.0 | | | | | | | | |
| 33 | | 2.5 | | | | | | | | |
| 34 | | 3.0 | | | | | | | | |
| 35 | | 3.5 | | | | | | | | |
| 36 | | 4.0 | | | | | | | | |

TABLE 2

| Experimental Example | Main Ingredient (Ba, Ca)TiO$_3$ | X (%) | $(Ba_{1-x}Ca_x)$/Ti | Accessory Ingredient (%) | | | | | | |
|---|---|---|---|---|---|---|---|---|---|---|
| | | | | Dy$_2$O$_3$ | BaCO$_3$ | ZrO$_2$ | Mn$_3$O$_4$ | V$_2$O$_5$ | Al$_2$O$_3$ | SiO$_2$ |
| 1 | $(Ba_{1-x}Ca_x)$ | 0.5 | 0.994 | 1.0 | 0.7 | 0.5 | 0.2 | 0.05 | 0.1 | 1.25 |
| 2 | | 1.0 | | | | | | | | |
| 3 | | 1.5 | | | | | | | | |
| 4 | | 2.0 | | | | | | | | |
| 5 | | 2.5 | | | | | | | | |
| 6 | | 3.0 | | | | | | | | |
| 7 | | 3.5 | | | | | | | | |
| 8 | | 4.0 | | | | | | | | |
| 9 | $(Ba_{1-x}Ca_x)$ | 0.5 | 0.997 | | | | | | | |
| 10 | | 1.0 | | | | | | | | |
| 11 | | 1.5 | | | | | | | | |
| 12 | | 2.0 | | | | | | | | |
| 13 | | 2.5 | | | | | | | | |
| 14 | | 3.0 | | | | | | | | |
| 15 | | 3.5 | | | | | | | | |
| 16 | | 4.0 | | | | | | | | |
| 17 | $(Ba_{1-x}Ca_x)$ | 0.5 | 1.000 | | | | | | | |
| 18 | | 1.0 | | | | | | | | |
| 19 | | 1.5 | | | | | | | | |
| 20 | | 2.0 | | | | | | | | |
| 21 | | 2.5 | | | | | | | | |
| 22 | | 3.0 | | | | | | | | |
| 23 | | 3.5 | | | | | | | | |
| 24 | | 4.0 | | | | | | | | |
| 25 | $(Ba_{1-x}Ca_x)$ | 0.5 | 1.003 | | | | | | | |
| 26 | | 1.0 | | | | | | | | |
| 27 | | 1.5 | | | | | | | | |
| 28 | | 2.0 | | | | | | | | |
| 29 | | 2.5 | | | | | | | | |
| 30 | | 3.0 | | | | | | | | |
| 31 | | 3.5 | | | | | | | | |
| 32 | | 4.0 | | | | | | | | |

Describing the preparing of the sample in more detail, when the slurry was prepared, base material main ingredient powder and accessory ingredient powder were mixed/dispersed using zirconia balls, mixed with ethanol/toluene and a dispersant, and then mechanically milled. Thereafter, additionally, a binder was mixed therewith so that a dielectric layer may have a suitable level of strength. Sheets having a thickness within the range of 10 μm to 15 μm were manufactured using the prepared slurry and a small doctor blade-type formation coater in order to manufacture a K2 bulk specimen, and stacked so that a green specimen had a thickness of about 0.8 mm after compressing the stacked sheets, followed by cutting, thereby forming a K2 bulk specimen having a size of 1.0 cm×1.0 cm (length×width).

After, the manufactured K2 bulk specimen was subjected to air-calcination at 400° C. and then sintered under the conditions of a sintering temperature of 1300° C. or less and a H$_2$ concentration of 0.5% or less. Thereafter, electrical characteristics, insulation resistance, temperature coefficient of capacitance (TCC), and the like, of the sintered K2 bulk specimen were measured. Room-temperature capacitance and dielectric loss of a multilayer ceramic capacitor (MLCC) to which the bulk K2 specimen was applied were measured using an LCR-meter at 1 kHz and AC 1 V, and room-temperature insulation resistance was measured after 60 seconds in a state in which ten samples each were taken and a DC voltage was applied thereto. Temperature coefficient of capacitance (TCC) was measured in a temperature range of −55° C. to 125° C. under the conditions of 1 kHz and AC 1 V. Results of measuring permittivity, resistivity, and high-temperature withstand voltage of the samples manufactured in Tables 1 and 2 were illustrated in the following Table 3 (Na substitution) and Table 4 (Ca substitution), including the unexpected results providing improved operation of MLCCs as detailed herein. Here, respective characteristics values and evaluation results were illustrated together, and ⊚ indicates "excellent", ○ indicates "good", Δ indicates "fair", and X indicates "defective".

TABLE 3

| Experimental Example | Characteristics (Na Based) | | | | | |
|---|---|---|---|---|---|---|
| | Permittivity | | Resistivity (Ω*cm) | | High-Temperature Withstand Voltage (V/μm) | |
| 1 | 2805 | ○ | 1.77E+08 | X | 42 | X |
| 2 | 2798 | ○ | 2.58E+09 | Δ | 55 | Δ |
| 3 | 2698 | Δ | 7.05E+09 | Δ | 62 | ○ |
| 4 | 2688 | Δ | 1.12E+10 | ○ | 70 | ○ |
| 5 | 2625 | Δ | 2.24E+10 | ○ | 74 | ○ |
| 6 | 2657 | Δ | 9.01E+10 | ○ | 80 | ○ |
| 7 | 2595 | Δ | 6.38E+10 | ○ | 78 | ○ |
| 8 | 2257 | X | 3.98E+10 | ○ | 74 | ○ |
| 9 | 2158 | X | 8.12E+10 | Δ | 76 | ○ |
| 10 | 3152 | ⊚ | 4.64E+08 | X | 61 | Δ |
| 11 | 3268 | ⊚ | 6.38E+09 | Δ | 75 | ○ |
| 12 | 2977 | ○ | 8.92E+10 | ○ | 76 | ○ |
| 13 | 2987 | ○ | 1.08E+11 | ○ | 83 | ○ |
| 14 | 2980 | ○ | 4.88E+12 | ⊚ | 91 | ⊚ |
| 15 | 2974 | ○ | 8.69E+12 | ⊚ | 95 | ⊚ |
| 16 | 2789 | ○ | 1.25E+13 | ⊚ | 92 | ⊚ |
| 17 | 2672 | Δ | 9.89E+11 | ○ | 82 | ○ |
| 18 | 2454 | Δ | 9.89E+10 | Δ | 86 | ○ |
| 19 | 3325 | ⊚ | 4.61E+09 | Δ | 65 | Δ |
| 20 | 3389 | ⊚ | 6.10E+10 | ○ | 74 | ○ |
| 21 | 3152 | ○ | 8.82E+10 | ○ | 80 | ○ |
| 22 | 3185 | ○ | 2.08E+11 | ⊚ | 92 | ⊚ |

TABLE 3-continued

| Experi-mental Example | Characteristics (Na Based) | | | | | |
|---|---|---|---|---|---|---|
| | Permittivity | | Resistivity (Ω*cm) | | High-Temperature Withstand Voltage (V/μm) | |
| 23 | 3088 | ○ | 5.65E+12 | ◎ | 105 | ◎ |
| 24 | 2986 | ○ | 9.69E+12 | ◎ | 98 | ◎ |
| 25 | 2812 | ○ | 3.25E+13 | ◎ | 96 | ◎ |
| 26 | 2906 | ○ | 1.89E+12 | ◎ | 85 | ○ |
| 27 | 2675 | △ | 8.94E+09 | △ | 86 | ○ |
| 28 | 2812 | ○ | 3.77E+08 | X | 46 | X |
| 29 | 2832 | ○ | 2.73E+09 | △ | 56 | △ |
| 30 | 2741 | △ | 8.15E+09 | △ | 64 | ○ |
| 31 | 2680 | △ | 1.95E+10 | ○ | 72 | ○ |
| 32 | 2639 | △ | 2.65E+10 | ○ | 79 | ○ |
| 33 | 2663 | △ | 8.65E+10 | ○ | 86 | ○ |
| 34 | 2545 | △ | 7.69E+10 | ○ | 86 | ○ |
| 35 | 2321 | X | 6.98E+10 | ○ | 82 | ○ |
| 36 | 2215 | X | 8.12E+09 | △ | 78 | ○ |

TABLE 4

| Experi-mental Example | Characteristics (Ca Based) | | | | | |
|---|---|---|---|---|---|---|
| | Permittivity | | Resistivity (Ω*cm) | | High-Temperature Withstand Voltage (V/μm) | |
| 1 | 2795 | ○ | 1.72E+09 | △ | 58 | △ |
| 2 | 2802 | ○ | 5.58E+09 | △ | 64 | ○ |
| 3 | 2620 | △ | 7.05E+09 | △ | 72 | ○ |
| 4 | 2598 | △ | 1.12E+10 | ○ | 75 | ○ |
| 5 | 2432 | △ | 2.28E+10 | ○ | 82 | ○ |
| 6 | 2409 | △ | 9.01E+10 | ○ | 80 | ○ |
| 7 | 2366 | △ | 2.38E+11 | ○ | 88 | ○ |
| 8 | 2093 | X | 5.98E+11 | ○ | 92 | ○ |
| 9 | 3006 | ◎ | 8.82E+09 | △ | 56 | △ |
| 10 | 3120 | ◎ | 4.64E+10 | ○ | 74 | ○ |
| 11 | 3100 | ◎ | 6.38E+12 | ◎ | 90 | ◎ |
| 12 | 2988 | ◎ | 8.12E+12 | ◎ | 120 | ◎ |
| 13 | 2784 | ○ | 1.08E+13 | ◎ | 112 | ◎ |
| 14 | 2720 | ○ | 2.12E+13 | ◎ | 115 | ◎ |
| 15 | 2501 | △ | 7.69E+12 | ◎ | 80 | ○ |
| 16 | 2126 | X | 5.25E+11 | ○ | 82 | ○ |
| 17 | 2210 | ◎ | 9.89E+09 | △ | 50 | △ |
| 18 | 3358 | ◎ | 9.82E+09 | △ | 75 | ○ |
| 19 | 3265 | ◎ | 8.62E+11 | ○ | 88 | ○ |
| 20 | 3206 | ◎ | 8.82E+13 | ◎ | 90 | ◎ |
| 21 | 2987 | ○ | 1.23E+13 | ◎ | 94 | ◎ |
| 22 | 2996 | ○ | 6.82E+11 | ○ | 82 | ○ |
| 23 | 2663 | △ | 4.27E+11 | ○ | 75 | ○ |
| 24 | 2610 | △ | 6.82E+09 | △ | 72 | ○ |
| 25 | 2990 | ○ | 1.66E+09 | △ | 52 | △ |
| 26 | 2846 | ○ | 5.28E+09 | △ | 68 | ○ |
| 27 | 2668 | △ | 8.05E+09 | △ | 72 | ○ |
| 28 | 2564 | △ | 1.60E+10 | ○ | 75 | ○ |
| 29 | 2458 | △ | 4.08E+10 | ○ | 82 | ○ |
| 30 | 2219 | △ | 8.89E+10 | ○ | 80 | ○ |
| 31 | 2360 | △ | 2.38E+11 | ○ | 75 | ○ |
| 32 | 1962 | X | 5.98E+10 | ○ | 78 | ○ |

Referring to the experimental results illustrated in Tables 3 and 4, first, in cases in which 0.5 to 3.5% of Na or Ca was added, that is, in cases in which in the composition represented by the Composition Formula $(Ba_{1-x}(Na, Ca)_x)TiO_3$, x satisfies $0.005 \leq x \leq 0.035$, resistance characteristics and withstand voltage characteristics were improved without a large change in dielectric characteristics, as compared to a case in which Na or Ca was not added at all. This may be interpreted that Ba was partially substituted with Ca or Na having a smaller ion size relative to that of Ba to cause lattice distortion, thereby suppressing the migration of an oxygen void, or the like, in a lattice, as described above.

In addition, a range in which the most surprisingly improved effect was obtained was deduced from the experimental results. As shown in Tables 3 and 4, when the ratio $Ba_{1-x}(Na, Ca)_x/Ti$ was set to be close to 1 (0.094 to 1.003), dielectric characteristics and resistance characteristics were excellent. In contrast, in cases of the compositions corresponding to the Comparative Examples in which $Ba_{1-x}(Na, Ca)_x/Ti$ was 0.994 (Experimental Examples 1 to 8 in Table 3 and Experimental Examples 1 to 8 in Table 4), dielectric characteristics or resistance characteristics were deteriorated. Similarly, it was confirmed that in cases of the compositions corresponding to Comparative Examples in which $Ba_{1-x}(Na, Ca)_x/Ti$ was 1.003 (Experimental Examples 29 to 36 in Table 3 and Experimental Examples 25 to 32 in Table 4), dielectric characteristics and resistance characteristics (particularly, dielectric characteristics) were deteriorated.

The above-mentioned condition that $0.994 < (Ba_{1-x}(Na, Ca)_x)/Ti < 1.003$ was satisfied was deduced from this result. As described above, when the $(Ba_{1-x}(Na, Ca)_x)/Ti$ value was close to 1, since the value of the axial ratio (c/a) was large and a level of polarization was also increased, high relative dielectric characteristics may be obtained. Furthermore, since a solid-solution limit of an element substituting a Ba site was most efficient, high dielectric characteristics and reliability may be obtained.

As set forth above, according to exemplary embodiments in the present disclosure, a dielectric composition having high permittivity and excellent withstand voltage characteristics, and a multilayer ceramic capacitor containing the same may be implemented.

While exemplary embodiments have been shown and described above, it will be apparent to those skilled in the art that modifications and variations could be made without departing from the scope of the present invention as defined by the appended claims.

What is claimed is:

1. A dielectric composition comprising an oxide of Ba and Ti as a main ingredient,
wherein the main ingredient is represented by $(Ba_{1-x}Na_x)TiO_3$, where $0.0055 \leq x \leq 0.035$ and $0.994 < (Ba_{1-x}Na_x)/Ti < 1.003$.

2. The dielectric composition of claim 1, further comprising 0.1 to 1.0 mol % of a first accessory ingredient based on 100 mol % of the main ingredient, wherein the first accessory ingredient is an oxide or carbonate of at least one among Mn, V, Cr, Fe, Ni, Co, Cu, and Zn.

3. The dielectric composition of claim 2, further comprising 0.1 to 1.0 mol % of a second accessory ingredient based on 100 mol % of the main ingredient, wherein the second accessory ingredient is an oxide or carbonate of at least one of Mg and Al.

4. A dielectric composition comprising an oxide of Ba and Ti as a main ingredient and 0.1 to 1.0 mol % of an accessory ingredient based on 100 mol % of the main ingredient,
wherein the main ingredient is represented by $(Ba_{1-x}Na_x)TiO_3$, where $0.005 \leq x \leq 0.035$ and $0.994 < (Ba_{1-x}Na_x)/Ti < 1.003$, or $(Ba_{1-x}Ca_x)TiO_3$, where $0.005 \leq x \leq 0.035$ and $0.994 < (Ba_{1-x}Ca_x)/Ti < 1.003$, and the accessory ingredient is an oxide or carbonate of at least one among Ce, Nb, La, and Sb.

5. The dielectric composition of claim 1, further comprising 0.1 to 1.0 mol % of an accessory ingredient based on 100 mol % of the main ingredient, wherein the accessory ingredient is an oxide or carbonate of at least one of Si, Ba, Ca, and Al.

6. The dielectric composition of claim 1, further comprising 0.1 to 1.0 mol % of an accessory ingredient based on 100 mol % of the main ingredient, wherein the accessory ingredient is a glass compound containing Si.

7. A multilayer ceramic capacitor comprising a ceramic body in which dielectric layers and internal electrodes are alternately stacked,
wherein the dielectric layer contains a dielectric composition containing an oxide of Ba and Ti as a main ingredient, and
the main ingredient is represented by $(Ba_{1-x}Na_x)TiO_3$, where $0.005 \leq x \leq 0.035$ and $0.994 < (Ba_{1-x}Na_x)/Ti < 1.003$.

8. The multilayer ceramic capacitor of claim 7, wherein the internal electrode contains nickel (Ni).

9. The multilayer ceramic capacitor of claim 7, wherein the dielectric composition further contains 0.1 to 1.0 mol % of a first accessory ingredient based on 100 mol % of the main ingredient, wherein the first accessory ingredient is an oxide or carbonate of at least one among Mn, V, Cr, Fe, Ni, Co, Cu, and Zn.

10. The multilayer ceramic capacitor of claim 9, wherein the dielectric composition further contains 0.1 to 1.0 mol % of a second accessory ingredient based on 100 mol % of the main ingredient, wherein the second accessory ingredient is an oxide or carbonate of at least one of Mg and Al.

11. The multilayer ceramic capacitor of claim 10, wherein the dielectric composition further contains 0.1 to 1.0 mol % of a third accessory ingredient based on 100 mol % of the main ingredient, wherein the third accessory ingredient is an oxide or carbonate of at least one among Ce, Nb, La, and Sb.

12. The multilayer ceramic capacitor of claim 11, wherein the dielectric composition further contains 0.1 to 1.0 mol % of a fourth accessory ingredient based on 100 mol % of the main ingredient, wherein the fourth accessory ingredient is an oxide or carbonate of at least one of Si, Ba, Ca, and Al.

13. The multilayer ceramic capacitor of claim 11, wherein the dielectric composition further contains 0.1 to 1.0 mol % of a fourth accessory ingredient based on 100 mol % of the main ingredient, wherein the fourth accessory ingredient is a glass compound containing Si.

14. The dielectric composition of claim 1, further comprising 0.1 to 1.0 mol % of an accessory ingredient based on 100 mol % of the main ingredient, wherein the accessory ingredient is an oxide or carbonate of at least one among Ce, Nb, La, and Sb.

15. A multilayer ceramic capacitor comprising a ceramic body in which dielectric layers and internal electrodes are alternately stacked,
wherein the dielectric layer contains the dielectric composition of claim 4.

* * * * *